INVENTOR
*E. PETERSON*
BY *H. A. Burgess*
ATTORNEY

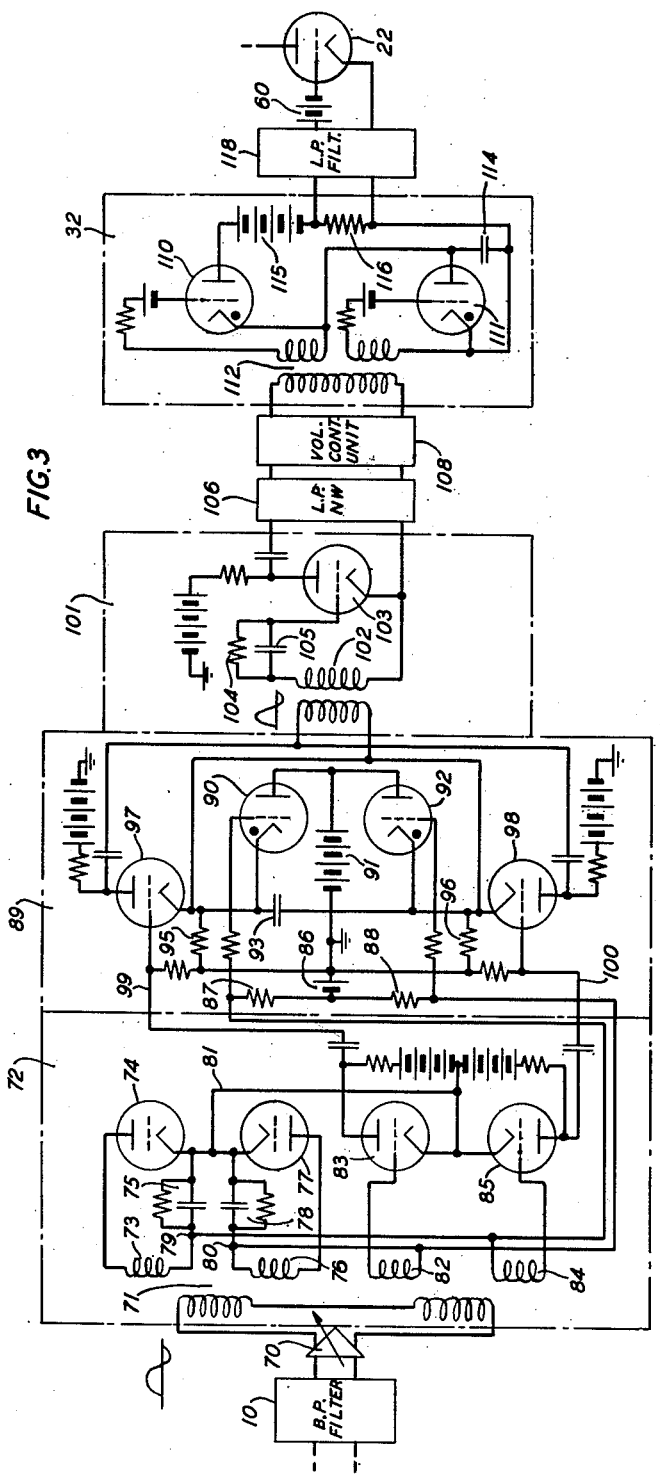
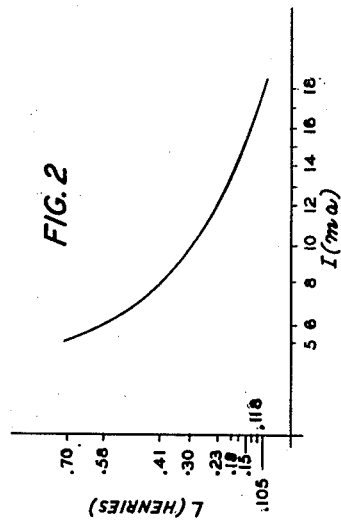

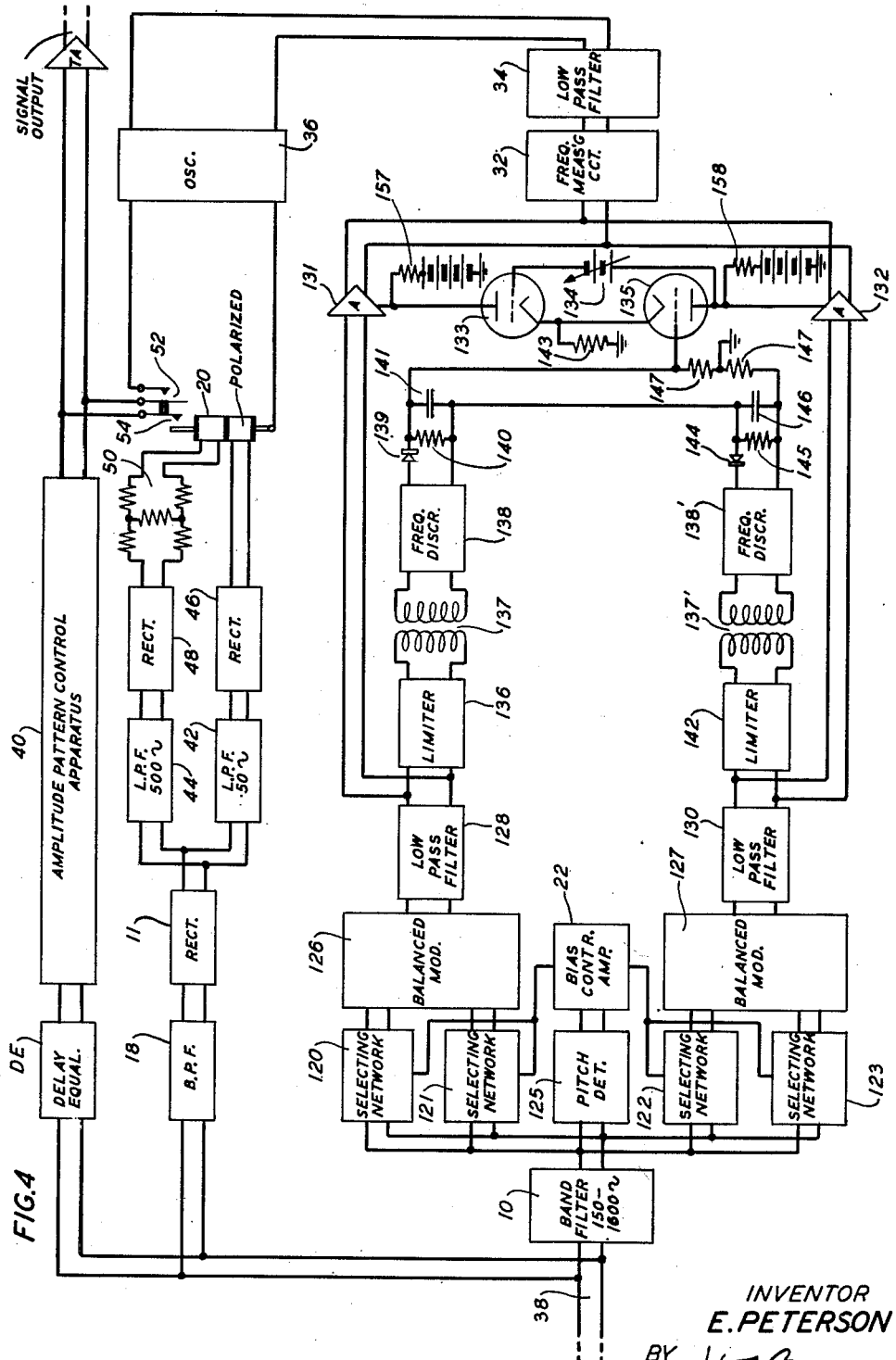

Patented Apr. 22, 1952

2,593,695

UNITED STATES PATENT OFFICE 2,593,695

ANALYZER FOR DETERMINING THE FUNDAMENTAL FREQUENCY OF A COMPLEX WAVE

Eugene Peterson, New York, N. Y., assignor to Bell Telephone Laboratories, Incorporated, New York, N. Y., a corporation of New York Application May 10, 1948, Serial No. 26,004

15 Claims. (Cl. 175—183)

This invention relates to signal wave transmission systems, and, more particularly, to the analysis of complex signal waves to derive information concerning their fundamental characteristics for use in such systems.

Signaling systems have been proposed in which the intelligence contained in the signal wave is extracted in the form of fixed and variable physical properties of the wave. In these systems only that information pertaining to the variable properties of the signal wave is transmitted to a receiving station, where it controls the operation of synthesizing equipment in the production of a reconstructed signal wave. One such system is described in U. S. Patent 2,151,091, March 21, 1939, to H. W. Dudley.

In such systems, the signal wave is analyzed to determine the character of the original sound wave from which it was derived. One manner in which this determination has been made is to observe the distribution of the energy content of the wave throughout its frequency spectrum. If the energy is found to be in discrete frequency subbands, the frequencies of which correspond to integral harmonic relations to some basic, or fundamental, frequency, the original sound wave is said to have been a voiced sound, such as arises from the vowel and near-vowel sounds. If, however, the energy is found to be distributed in an apparently random fashion throughout the frequency spectrum of the signal wave, it is known that the wave derived from a so-called unvoiced sound such as is produced in uttering the consonants. In addition to determining the wave's voiced or unvoiced character, the analysis also determines the amount of the total wave energy that is contained in each of a predetermined number of frequency subbands, as well as the frequency of the fundamental, or basic, component if the signal energy is found to be in the integrally related frequency subband relation. When the fundamental wave component is actually present in the analyzed signal wave, it may be segregated by selective networks. When several of the lower order harmonically related wave components are present, the determination of the frequency of the fundamental component may be made, notwithstanding the absence of the fundamental component, by combining the several wave components in a suitable heterodyning arrangement. If the phase and amplitude relations between the several combined components are suitable, the heterolyne product derives from the combination of several adjacently located wave components, and is numerically equal in frequency to the fundamental wave component. However, as occasionally happens, the phase relation of the adjacently located wave components may be unstable, and they may momentarily collectively combine in such fashion that the heterodyne product derives from non-adjacent components. Under these circumstances, the heterodyne product may momentarily possess a frequency that is greater than the frequency of the wave's fundamental component, and thereby indicate a change in pitch of one or more octaves when actually no pitch change would have occurred in the original signal.

It is accordingly an object of the present invention to improve the method and means for determining the voiced or unvoiced character of a signal wave, and also for determining the frequency of the fundamental component of the signal wave.

It is a feature of this invention that this frequency determination may be made notwithstanding the occasional absence or presence of the fundamental component in the analyzed signal wave.

It is also a feature of this invention that the occasional shifting of the relative phase relation of the signal wave's components has no effect upon the correctness of the frequency indication derived by the method of this invention.

Still another feature of the invention is the derivation of this desired information from a relatively few of the signal wave components, the same ones of which continue to be selected notwithstanding that they are constantly changing their location in the frequency spectrum.

A further feature of the invention is that it enables the simultaneous derivation of more than one indication of the frequency of the wave's fundamental component in such manner that only the lowest frequency indication will be selected for ultimate use.

In accordance with this invention, the speech signal is first analyzed to determine its voiced or unvoiced character. If the wave is found to be of the voiced type an approximate, or preliminary, determination of its pitch, or the frequency of its fundamental component, is made. Also, one or more pairs of adjacently located harmonic wave components are selected from the speech signal wave by a process in which the approximate, or preliminary, pitch determination is used to control the selection of these wave components in such manner that the same pair, or pairs, of components continue to be selected notwithstanding their rapidly changing frequency location. The adjacently located pair, or pairs, of wave components are then combined as pairs to derive an indication of the difference in their frequencies, which difference indication is representative of the frequency of the fundamental wave component. It is characteristic of such a difference frequency indication, derived in accordance with this invention, that it is considerably more accurate than the frequency difference indication derived by the previously known heterodyning process. In the previously known process a number of wave components are combined at varying amplitudes and phase relations to produce by their addition and cancellation the final difference frequency indication. As previously stated, the additions and cancellations of the various components may occasionally give rise to a frequency difference that is derived from non-adjacent components. In accordance with the present invention, this difference frequency indication is obtained directly from a single pair of adjacently located wave components in such manner that the derived indication always results from the adjacently located components.

The manner in which the foregoing objects and features are realized may be better understood from the following detailed description of the invention when considered in connection with the drawing, in which:

Fig. 2 is an explanatory graph indicating one of the properties of the variable inductors which are incorporated as circuit elements in the embodiments of Figs. 1 and 4;

Fig. 3 is a schematic illustration of one means for obtaining the preliminary, or approximate pitch indication that is used in the embodiments of Figs. 1 and 4; and Fig. 4 is a schematic diagram of a second embodiment of the invention in which two simultaneous frequency indications are derived, and that one is selected, which indicates the lower fundamental frequency.

Figure 1:
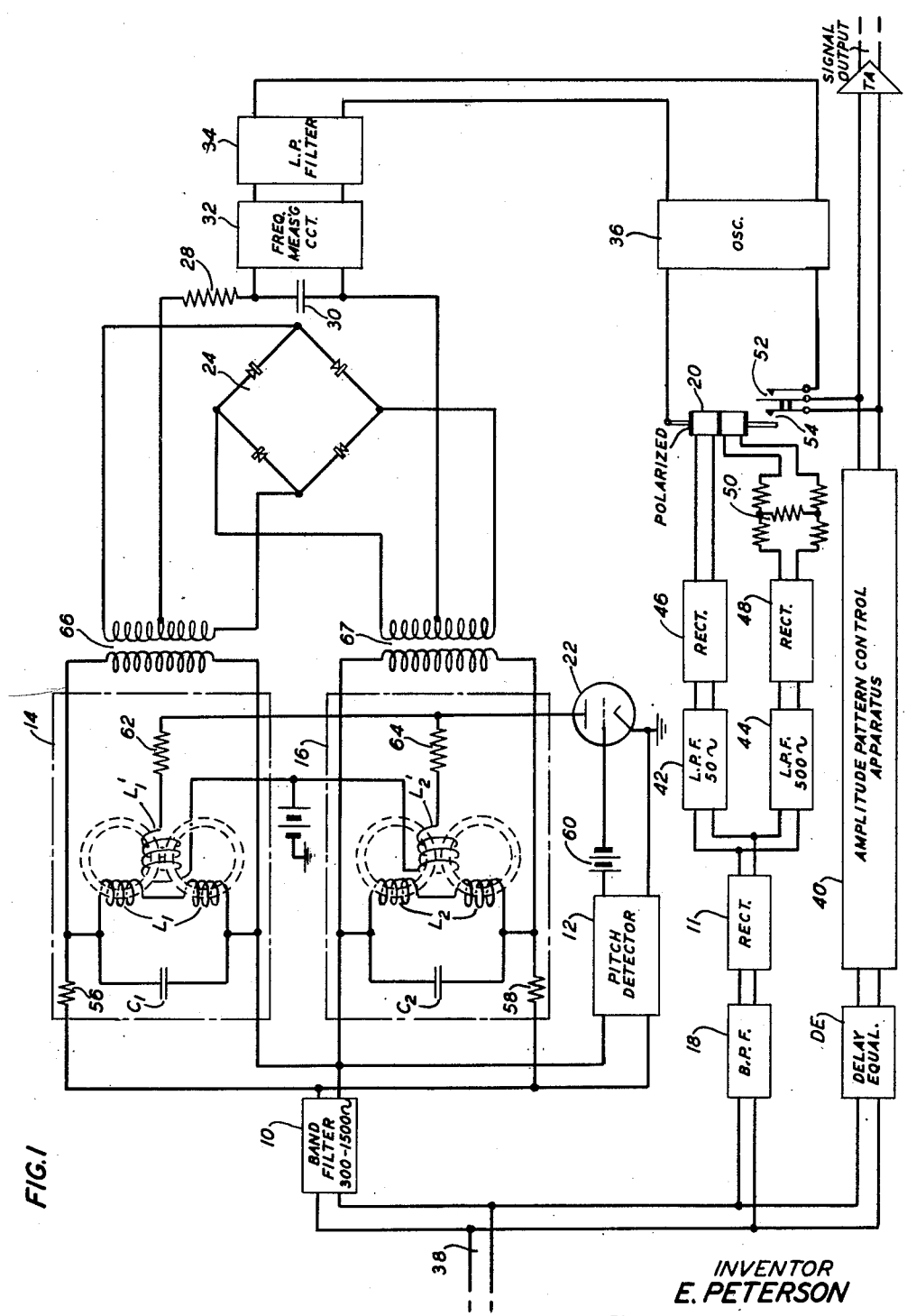
Fig. 1 is a schematic diagram of one embodiment of the invention, as incorporated in a wave analyzing and synthesizing signaling system, in which the frequency of the wave's fundamental component may be secured from only two of the harmonically related wave components.

With reference to Fig. 1, one embodiment of the invention is shown as being incorporated in the pitch determining branch of a wave analyzing and synthesizing type of transmission system, such as was disclosed and claimed in United States Patent 2,151,091, March 21, 1939, to H. W. Dudley. In the lower portion of Fig. 1, that branch of the circuit which comprises the delay equalizer DE and amplitude pattern control apparatus 40 functions to derive the amplitude pattern control currents in a manner described in the above-mentioned Dudley patent. For a complete description of the operation of this apparatus, and also of the manner of using these amplitude pattern control currents, reference may be had to the above-mentioned Dudley patent. In the upper portion of Fig. 1, band filter 10, which may have a pass band of approximately 300 cycles to 1500 cycles per second, is connected to the signal input path 38. The output of filter 10 is connected to three parallel circuit branches. One circuit branch includes the preliminary pitch detector 12 and its associated bias control amplifier 22. In each of the other two parallel circuit branches there is included one of similarly constructed frequency selective networks 14, 16. Each of these networks includes a variably res- onant circuit which may be either in series or parallel resonant arrangement, and which may have as its variable element either the capacitor or inductor. For the purposes of this disclosure, these networks are shown as comprising parallel resonant structures in which the resonating inductance is a variable element $L_1$ or $L_2$. The effective value of the resonating inductance $L_1$ or $L_2$ is controlled by the flux producing effect of a second winding $L_1'$ or $L_2'$, which is wound on the same coil cores with the resonating winding. The influence of this winding is variable in accordance with the magnitude of the current flowing in it. Each selective network 14, 16 includes a decoupling resistor 56, 58, respectively, which is preferably several times as large as the resistive component of the selective network at its resonant frequency. For the condition of minimum current through the control windings $L_1'$, $L_2'$, the selective networks 14, 16 are constructed and arranged to have a frequency of resonance at, or near, predetermined frequencies which correspond respectively to the $n^{th}$ and $(n\pm1)^{th}$ harmonic components of the fundamental frequency. For example, if the frequency of the fundamental component of the signal wave might be expected to vary between 80 and 300 cycles per second, the selective networks 14, 16 might be respectively arranged to resonate at about 320 and 400 cycles per second, when the minimum value of control current is flowing in the control, or biasing, windings $L_1'$ or $L_2'$, respectively. Biasing winding $L_1'$ and $L_2'$ are included in the anode-cathode path of bias control amplifier 22 in such manner that changes in the anode current of this amplifier will change the effective control exercised by these windings. Resistors 62, 64 are included to permit equalizing the effective resistance of the two windings. Each selective network terminates in a transformer 66, 67, the secondary windings of which are connected in a balanced modulator circuit 24. A frequency sensitive, or slope, circuit comprising resistor 28 and capacitor 30, is included in the output circuit of modulator 24 to operate as a combined low-pass filter and an attenuating network, the attenuation of which increases with frequency of the applied wave. Frequency measuring circuit 32 may be any suitable arrangement for providing a unidirectional voltage the magnitude of which is directly related to the frequency of the wave applied to its input terminals. One form of a suitable device for this purpose is illustrated in Fig. 3, and will be described later. A low-pass filter 34 smooths, or integrates, the unidirectional voltage produced by the frequency measuring circuit 32 before this voltage is used to control the frequency of low frequency oscillator 36. Oscillator 36 is an optional arrangement, and is included herewith for the purpose of converting the unidirectional voltage from the frequency measuring circuit to a form more suitable for transmission in a system such as is described in the above-mentioned Dudley patent.

The selective networks 14, 16 will select from an unvoiced signal wave any randomly distributed energy that coincides with their frequency of resonance. This selection might give rise to an indicated frequency for a fundamental component that never actually existed. To prevent the utilization of this erroneous information, band filter 18 is bridged across the input signal circuit 38, to select a relatively high frequency band of signal wave components from the input wave. This selected band may be rectified at rectifier 11 before transmission to the parallel circuit branches which include low-pass filter 42 and rectifier 46 in the upper branch, and low-pass filter 44, rectifier 48 and attenuating pad 50 in the lower branch. The two branches are differentially connected to biased polarized relay 20. Relay 20 is maintained in an unoperated position at all times except when the voiced type of signal wave is applied to the input of band-pass filter 18, at which time this relay operates to close contacts 52, 54, and to connect the output of oscillator 36 to the remainder of the transmission signaling equipment.

In its operation, the above-described arrangement receives the speech signal wave from a source (not shown) over connecting circuit 38 at the left of Fig. 1. This input wave is divided into three major portions. The first portion is applied to the circuit branch which includes the delay equalizer DE and the amplitude pattern control apparatus 40, where it is analyzed to determine the energy distribution within predetermined frequency subbands in the manner described in the previously mentioned Dudley patent 2,151,091. The second wave portion is applied to the circuit branch comprising band filter 18 which selects a band of relatively high frequencies, for example, in the order of 3,000 to 5,000 cycles per second. In a normal speech signal wave, the energy levels of the harmonically related frequency subbands decrease rapidly as their frequency is increased; whereas, in the case of the randomly distributed energy, the energy level is approximately independent of frequency. The relatively high frequency of the band selected by filter 18 presents a strong probability that the level of the randomly distributed energy will considerably exceed the level of the discretely distributed energy. The selected band of energy, when detected in rectifier 11, gives rise to a great many different frequency components in the usual manner. Low-pass filter 42 will select from these rectified components only random energy components since its low cut-off frequency, of say 50 cycles per second, will exclude all of the discretely distributed variety, which for normal speech will be separated by a frequency interval of not less than 80 cycles per second. Low-pass filter 44 has a wider pass-band, for example, 500 cycles per second, and will accept both types of energy. Because of the wider band width of filter 44, there should, in the case of only unvoiced sound, be about 10 decibels more output from this filter than from the 50-cycle filter 42. This difference in level is equalized by the attenuating network 50. Rectifiers 46, 48 convert the selected energy to unidirectional voltages before it is differentially applied to the biased polarized relay 20. This relay remains unoperated for the unvoiced sound, but is operated by voiced sound energy so that relay contacts 52, 54 are closed and the output of oscillator 36 is connected to the input of transmitting amplifier TA, and to the remainder of the transmitting apparatus.

Again, at the left of Fig. 1, band filter 10 selects from the speech signal wave received over input circuit 38, a suitable band of signal frequencies, for example, from about 300 cycles to about 1500 cycles per second. This selected band of frequencies is simultaneously applied to the preliminary pitch detector 12 and to the selecting networks 14, 16. One of these networks is so constructed that it has a minimum resonant frequency which is equal to the $n^{th}$ harmonic of the expected minimum fundamental frequency component of 80 cycles per second. The other selective network is so constructed that it has a minimum resonant frequency that is substantially equivalent to the next adjacent harmonic component ($n \pm 1$) of the 80-cycle fundamental. As was previously stated, these minimum frequencies of resonance occur at a time when the bias control current through the control windings $L_1'$, $L_2'$ is at its minimum value.

In the preliminary pitch detector 12 there is generated a unidirectional voltage, the magnitude of which varies linearly with changes in the frequency of the fundamental component of the speech signal wave received from band filter 10. This pitch detector may be any suitable device for producing this unidirectional voltage, which voltage need be only an approximate representation of the fundamental frequency. One device that is suitable for this preliminary pitch determination is illustrated in Fig. 3, and will be generally described in connection with the discussion of that figure. This illustrated device is more completely described and claimed in the present inventor's copending application, Serial No. 17,204, filed March 26, 1948. For the purposes of this immediate description, it is sufficient to realize that the preliminary pitch detector 12 produces a unidirectional voltage the magnitude of which bears a reasonably close, substantially linear relation to the frequency interval separating the harmonically disposed components of the signal wave. The magnitude of this unidirectional voltage may vary at a maximum rate of approximately eight changes per second, which corresponds to syllabic intervals in normal speech. Bias source 60 in the control grid-cathode circuit of amplifier 22 adjusts the operating conditions of this amplifier to the low point of its linear range. Changes in the variable voltage obtained from the preliminary pitch detector 12 aid, or oppose, the voltage from bias source 60 to linearly control the magnitude of the current flowing in the anode-cathode path of amplifier 22. This anode-cathode path includes the variable inductor control windings $L_1'$ and $L_2'$ of the selective networks 14, 16.

In Fig. 2 there is shown a graph which illustrates the manner in which the effective inductance L of the resonating winding $L_1$ or $L_2$ may vary as the magnitude of the bias control current through the control winding $L_1'$ or $L_2'$ is varied. From this graph it will be noted that the effective inductance L varies inversely as the square of the control winding biasing current, in the range of current values from about 9 milliamperes to about 18 milliamperes. If desired, the shape of this curve may be suitably changed, or extended, by the choice of a suitable permanent, or residuary, biasing current. If, as indicated in Fig. 2, the effective inductance L varies as the inverse of the squared biasing current, $$L = \frac{K}{I^2}$$

the relation between the reactances at the point of resonance may be stated as $$f_r = \frac{1}{2\pi\sqrt{KC}}$$

where K is a circuit constant that is determined by the structure of the inductance coil, and I is the current in the control winding $L_1'$ or $L_2'$. Therefore, if the magnitude of the biasing current I in the control winding $L_1'$ or $L_2'$ is increased in linear relation to the changes in the frequency separating adjacent components of the signal wave, and the network inductive and capacitive elements are suitably proportioned, the network will track or follow the wave component as it changes in frequency. In addition to suitably proportioning the inductive and capacitive components of the network to secure the proper frequency selection, it is also desirable that these components be so proportioned that small variations in the magnitude of the biasing current I do not introduce phase modulations into the detected output of the selected harmonics. This may be accomplished by so proportioning the network components that the phase shift through each network is substantially the same for proportional changes in the frequency of resonance of the network. The actual values chosen for the capacitive and inductive elements will, of course, depend upon a number of circuit factors, such, for instance, as the integral number of the harmonic component to be selected, the factor K of the specific inductor used, and the relative magnitude of the resistive component of each network at the resonant frequency. If it be assumed that it is desired to select the $n^{th}$ harmonic and the $(n+1)^{th}$ harmonic under circumstances where the resonant resistive components of the two networks are equal, that is, where $R_{14}=R_{16}$, then the magnitude of the capacitance $C_1$ with respect to capacitance $C_2$ may be expressed by the fraction $$\frac{(n+1)}{n}$$

This relationship also holds true for the relative magnitudes of the resonating inductances $L_1$ and $L_2$. If, however, the ratio of the resistances of the networks at the resonant frequency corresponds to the ratio of the selected harmonic components, that is, if $$\frac{R_{14}}{R_{16}}=\frac{(n)}{(n+1)}$$

either set of components may be in unity relationship, and the conjugate components may be proportioned in the order of $$\frac{(n+1)^2}{(n)^2}$$

If the components of the selective networks 14, 16 are proportioned in accordance with one of the foregoing proportional relationships, one network will select the $n^{th}$ harmonic wave component while the other network simultaneously selects the $(n+1)^{th}$ harmonic component. The remaining wave components will be eliminated, or will be sufficiently attenuated to a level that precludes their influencing the derived pitch indication. The selected components are passed through transformers 66, 67 and the balanced modulator 24 where they are combined in a conventional manner to produce both sum and difference frequency components of modulation. The frequency sensitive network comprising resistor 28 and capacitor 30 is included in the output of the modulating circuit arrangement 24 and attenuates the modulation products in inverse relation to their frequency such that the lowest frequency difference product emerges at a considerably higher level than its complementary sum product. The frequency measuring circuit 32 operates in a manner which will be presently described in connection with Fig. 3 to produce a unidirectional voltage pulse in its output circuit each time that the selected low frequency difference product attains a predetermined magnitude in its positive half cycle. The unidirectional voltage pulses obtained from measuring circuit 32 are smoothed, or averaged, in the low-pass filter 34 to produce an average unidirectional voltage the magnitude of which changes in accordance with changes in the frequency of the low frequency difference product secured from the balanced modulator 24. This varying unidirectional voltage controls the frequency of oscillation of low frequency oscillator 36 to produce a suitable low frequency wave for combination with the amplitude pattern control currents derived from the apparatus 40 to be used for control of the synthesizing apparatus in the usual manner.

If the above described operation occurred in connection with an unvoiced speech wave, it is possible that the selecting networks 14, 16 would have selected sufficient energy therefrom to produce in the output circuit of low frequency oscillator 36 a spurious indication of a fundamental frequency. It will be recalled that polarized relay 20 remains in its unoperated position for all unvoiced speech wave inputs. Therefore, its contacts 52, 54 would remain in the unoperated position and any output from oscillator 36 would not be combined with the amplitude control currents derived from apparatus 40.

In Fig. 3 there is shown a circuit arrangement such as would be suitable for use as the preliminary pitch detector 12 of Fig. 1. As previously stated, this circuit arrangement is described and claimed in the present inventor's copending application, Serial No. 17,204, filed March 26, 1948. However, for the purpose of this disclosure, a brief general description of the structure and operation of this arrangement will be given here. At the left of Fig. 3, speech signal energy is received from band filter 10 and is applied to constant volume amplifier 70, which may be controlled in conventional manner. The output of amplifier 70 is then applied through transformer 71 to the input of differential discriminator 72, wherein any asymmetry in the speech signal is emphasized. The upper half of discriminator 72 comprises two bias producing circuits one of which includes transformer secondary winding 73, diode electron discharge device, or rectifier, 74, and load circuit 75. The other bias producing circuit comprises secondary winding 76, diode electron discharge device, or rectifier, 77, and load circuit 78. The lower portion of the discriminator 72 comprises a two-channel amplifying system, one channel of which includes secondary winding 82 and triode electron discharge device, or amplifier, 83. The second amplifying channel comprises secondary winding 84 and amplifying device 85. In the upper, or bias producing section of discriminator 72, there are produced two potentials at points 79, 80 which are negative with respect to the common cathode connection 81. If a symmetrical wave is applied to the secondary windings 73, 76, the negative potential at points 79, 80, will be equal. However, if an asymmetrical wave is applied to these windings, one bias producing circuit will conduct current during a greater portion of its positive cycle than will the other circuit, and the negative potentials at points 79, 80 will be unequal. Secondary windings 82, 84 of the amplifying section are so relatively disposed that they simultaneously apply oppositely poled signal wave voltages to the control grids of their respective amplifying elements 83, 85. These secondary windings 82, 84 are so interconnected with the negative potential points 79, 80 that the control grid electrode of each amplifying element 83, 85 receives a control electrode bias from signal wave voltages of opposite polarity to the polarity of the voltage it is currently amplifying. In this manner, that polarity of the signal wave which contains the peaks of greatest amplitude is further enhanced, or enlarged, with respect to the oppositely poled voltage. The differentially amplified signal wave voltages from amplifying elements 83, 85 are applied to amplifying element 97, 98 in the polarity selector 89 over interconnecting circuits 99, 100, respectively. Polarity selector 89 comprises an amplifying section and a commutating section, the latter of which includes the gas-filled electron discharge devices 90, 92 together with the capacitor 93 and resistors 95, 96. Negative bias source 86 is so proportioned that when no signal, or a symmetrical signal is applied to the differential discriminator 72, the devices 90, 92 are held just below their operating points. It will be recalled that when an asymmetrical input wave is applied to the differential discriminator 72, there results unequal negative potentials at points 79, 80 of the bias producing section of the discriminator. Potential points 79, 80 are interconnected through equal resistors 87, 88, in the control electrode-cathode circuit of each of the gas tubes 90, 92. The equalization of any potential difference between these two points 79, 80 results in increasing the control electrode bias of one or the other of the gas tubes 90, 92 to a point where that tube conducts, while its conjugate member remains nonconductive. Current conduction in either of the gas tubes 90, 92, generates a substantial voltage across its associated cathode resistor 95, 96 which voltage simultaneously renders the associated triode amplifying element 97, 98 nonconductive and also impresses across capacitor 93 a potential difference that is substantially equal in magnitude to the generated voltage. This voltage results in one or the other of the amplifying devices 97, 98 in the polarity selector 89 becoming nonconductive, while its conjugate member remains conductive and amplifies the the appropriate portion of the differentially amplified signal voltage wave as it is received from amplifying element 83 or 85. If, now, it is assumed that the existing potential difference between points 79, 80 of the differential discriminator is reversed in polarity, the control electrode bias of the then nonconductive gas tube will be increased to a point where current conduction is initiated in that tube. Simultaneously, the control electrode bias of the conducting tube will be lowered to its original state or to a lower value. This newly started current conduction will generate a voltage across the appropriate cathode resistor 95 or 96, which voltage will be substantially equal and opposite to the existing potential difference across capacitor 93. Equalization of the potential difference across capacitor 93 results in momentarily raising the cathode potential of the initially conducting gas tube to a point where current conduction is momentarily discontinued. This momentary stoppage of current conduction is sufficient to allow the associated control grid electrode to regain control of that gas tube, and since this control electrode has been returned to a sufficient negative potential by the combined effect of bias source 86 and the voltage drop across its associated resistor 87, 88, this electrode now holds its gas tube nonconductive. This change in conduction removes the previously existing voltage that was generated across its cathode resistor 95 or 96, as the case may be, and the associated amplifying element 97, 98 of the polarity selector 89 becomes conductive. The opposite polarity of the differentially amplified signal voltage wave is now amplified, or selected, by the polarity selector 89. The polarity selector 89 thus operates to amplify, or select, that polarity of the signal wave which contains the voltage peak of greatest amplitude after it has been differentially amplified in the differential discriminator 72.

The output circuits of polarity selector 89 are connected in parallel to the input of amplitude discriminator 101. Discriminator 101 is essentially a self-biasing detecting device which may include the transformer secondary winding 102, and the load network comprising resistor 104 and capacitor 105 in the control grid-cathode circuit of a triode electron discharge device 103. Resistor 104 and capacitor 105 may have such values that they collectively possess a time constant characteristic of about .03 second. Resistor 104 should be so proportioned that it is relatively large as compared to the reactance of capacitor 105 at the higher signal frequency. The action of this circuit arrangement is such that the control electrode acquires a negative bias of such magnitude that only the peak of maximum amplitude in each cycle of recurring wave components causes a change in the magnitude of the current flowing in the anode-cathode circuit of electron device 103. Since this peak of maximum amplitude in each cycle will be of comparatively short duration, there will be communicated to the low-pass network 106, a series of voltage pulses which are separated by an interval corresponding to the interval between successive maximum voltage peaks of the wave detected in amplitude discriminator 101. These voltage pulses are smoothed in the low-pass network 106 to produce a pulsating voltage that has a component which is approximately sinusoidal in character and has a frequency of alternation that is equal to the pulse recurrence rate of the detected wave. The level of this pulsating, or sinusoidal, component of voltage is restored to a suitable magnitude in a constant volume amplifier, or volume control unit 108.

The frequency measuring circuit 32, which has the same configuration as the frequency measuring circuit 32 of Fig. 1, may be used to measure the frequency of this repeated electric wave component, since its output voltage, as measured at the output terminals of the low-pass filter 118, is proportional to the frequency of the input wave. In this frequency measuring circuit, tubes 110 and 111 may be grid controlled gas discharge tubes with their control electrode potentials adjusted such that with no applied input wave both tubes are nonconductive. The two secondary windings of input transformer 112 are so connected that, when a wave is applied to the primary winding of the transformer, the control electrode of gas tube 110 will be positive with respect to its cathode when the control electrode of gas tube 111 is simultaneously negative with respect to the cathode of that tube. When the applied signal carries the grid of tube 110 sufficiently positive that tube will become conducting, and condenser 114 will be rapidly charged from plate, or anode, battery 115 through the current conduction path which includes resistance 116 and the anode-cathode path of tube 110. When the potential across capacitor 114 has attained a sufficient value, the potential of plate source 115 will be insufficient to maintain current conduction in tube 110, and this tube will become nonconducting. Gas tube 110 cannot again become conducting until the potential across capacitor 114 has been dissipated. This condition will not occur until the applied signal wave has changed its polarity and has acquired a potential of sufficient magnitude to initiate current conduction in tube 111, at which time the capacitor 114 is discharged through the anode-cathode path of this latter tube. This cycle of operations will take place once per cycle of the applied signal wave. During each such cycle of operation, when gas tube 110 is conducting current, there will be generated across resistor 116 a voltage pulse of uniform magnitude and duration. These repeated voltage pulses may be smoothed, or averaged, in low-pass filter 118 to produce an average unidirectional voltage, the magnitude of which is directly proportional to the frequency of the wave applied to the input of the frequency measuring circuit 32. Changes in the magnitude of this variable voltage may be utilized to aid or oppose the potential from bias source 60, and thereby control the magnitude of the current flowing in the anode-cathode path of bias control amplifier 22 in a manner and for the purpose as previously explained in connection with Fig. 1.

Under certain circumstances it may be desirable to employ as a preliminary pitch detector, one that may reasonably be expected to occasionally, and momentarily, indicate the pitch as being higher than its actual value. As was previously explained, when a plurality of wave components are combined in a heterodyning circuit arrangement to produce a difference frequency component, it occasionally happens that the difference frequency component is derived from nonadjacent components of the wave. This condition gives rise to a pitch, or fundamental frequency, indication which may be double the true frequency of the fundamental component of the wave. The circuit arrangement of Fig. 4 provides a means for insuring that such an occasional break in the operation of the preliminary pitch detector will not affect the final indication of the wave's fundamental frequency. At the left side of Fig. 4, signal input circuit 38 is connected to band-pass filter 10, which in this embodiment may have a pass-band from about 150 cycles to 1600 cycles per second. Also connected to circuit 38 are two circuit branches one of which includes band-pass filter 18 and polarized relay 20 for the enabling purpose as was previously described. The other circuit branch includes delay equalizer DE and amplitude pattern control apparatus 40 for the purpose of providing the amplitude pattern control currents as was previously mentioned. Five parallel circuit branches are connected to the output of filter 10, four of which include selective networks of the type described in connection with Fig. 1. Two of these networks, say for example networks 120 and 121, are so constructed and arranged as to select the $n^{th}$ and $(n+1)^{th}$ harmonic of the indicated fundamental frequency. The remaining two networks are arranged to select adjacent harmonics of one-half the indicated fundamental frequency, or the $$\frac{n}{2}^{th} \text{ and } \left(\frac{n+1}{2}\right)^{th}$$

wave components. Preliminary pitch detector 125 is also connected to the output of filter 10, and produces a plurality of wave components of which one is usually equal in frequency to the frequency difference between adjacently located wave components. This derived wave component may easily be converted to a unidirectional voltage, the magnitude of which is proportional to the frequency of the derived component. Bias control amplifier 22 is controlled by this unidirectional voltage in a manner previously described in connection with Fig. 1. The current flowing in the anode-cathode path of amplifier 22 operates to control the effective inductance of the variable inductor included in each selective network 120 to 123, inclusive, in the manner previously described in connection with Fig. 1. Balanced modulators 126 and 127 are respectively connected to the output of the upper and lower pairs of the selective networks. Low-pass filters 128, 130, may each have an upper cut-off frequency of about 325 cycles and respectively eliminate the higher frequency wave components from the outputs of modulators 126 and 127. Switching amplifiers 131, 132 are respectively bridged across the output of low-pass filters 128, 130. The control electrode bias of these amplifiers is dependent upon the current conduction state of electron discharge devices 133, 135 in such manner that an amplifier 131, 132 permits transmission therethrough only when its associated electron discharge device 133, 135 is nonconductive. The output circuits of the switching amplifiers are connected in parallel to the input of frequency measuring circuit 32, the unidirectional output voltage of which is smoothed and averaged in low-pass filter 34 before it is used to control the frequency of oscillation of low frequency oscillator 36 in the manner previously described in connection with Fig. 1. Also connected to the output of low-pass filters 128 and 130 are two circuit branches, the upper one of which includes a limiter, or constant output device 136; transformer 137; a frequency discriminator, or slope circuit 138; unidirectional, or rectifying, device 139; and the load network comprising resistor 140 and capacitor 141 in parallel arrangement. A similarly constructed circuit branch is connected to the output of low-pass filter 130, and includes limiter 142; transformer 137'; frequency discriminator 138'; unidirectional conducting, or rectifying device 144; and the load network comprising resistor 145 and capacitor 146. It will be noted that the unidirectional conducting, or rectifying devices 139, 144 are poled such that the upper end of load resistor 140 and the lower end of resistor 145 assume relatively positive potentials whenever current is conducted by the associated unidirectional device 139 or 144. The upper and lower load networks are differentially connected through the balanced biasing resistor 147, 147, the mid-point of which is at ground potential, and the upper end of which is connected to the control electrode of electron discharge device 135. Bias source 134 and cathode resistor 143 so regulate the control electrode-cathode potentials of the vacuum tubes 133, 135 that current conduction exists in only one tube at a time. When the upper end of balanced resistor 147, 147 is at a potential no lower than ground potential vacuum tube 135 conducts current and tube 133 is nonconductive. Under these circumstances, switching amplifier 131 is conductive and amplifier 132 is in its nonconductive state. The voltage generated across anode resistors 157, 158 provides means for reversing the conductive state of the switching amplifiers when conduction changes from tube 135 to tube 133.

In its operation, the embodiment of Fig. 4 resembles that of Fig. 1 in that the circuit branch that is connected to band-pass filter 18 controls the enabling and disabling of the pitch determining circuit in the same manner as was described in connection with Fig. 1. Similarly, the circuit branch that is connected to the delay equalizer DE and apparatus 40 functions to produce the various amplitude pattern control currents in a manner previously referred to. Band-pass filter 10 selects a band of frequencies, for example from about 150 cycles to about 1600 cycles per second, and preliminary pitch detector 125 produces a unidirectional voltage the magnitude of which is substantially linearly related to the frequency of the fundamental component of the signal wave. This varying unidirectional voltage controls the magnitude of the current flowing in the anode-cathode path of bias control amplifier 22 in such manner that the resonant frequency of the parallel resonant circuit that is included in each selective network 120 to 123, inclusive, is varied in accordance with the magnitude of this current. If, for illustrative purposes, it be assumed that selective network 120 is so constructed that it has a resonant frequency of about 375 cycles per second when the minimum current flows through its bias control winding, this network will then select the $(n+1)^{th}$, or fifth harmonic of the fundamental frequency as it is indicated by the preliminary pitch detecting circuit 125. If detector 125 correctly indicates the proper frequency, filter 120 will then select the fifth harmonic of the true fundamental frequency. However, if detector 125 indicates a double frequency, selective network 120 will then tend to select the tenth harmonic of the true fundamental frequency. In similar fashion, network 121 may be constructed to have an initial resonant frequency of about 300 cycles in which case it will tend to select the $n^{th}$, or fourth, harmonic frequency. Network 122 may have an initial, or minimum, resonant frequency of about 185 cycles corresponding to the $$\left(\frac{n+1}{2}\right)^{th}$$

harmonic component, and network 123 may similarly be proportioned to select the $$\left(\frac{n}{2}\right)^{th}$$

or second, harmonic by having a minimum resonant frequency of about 150 cycles per second. From the foregoing, it will be noted that the upper two selective networks 120, 121 function to select adjacent harmonics of the frequency indicated by pitch detector circuit 125. Similarly, the lower pair of selective networks 122, 123 function to select adjacent harmonics of one-half the indicated frequency. If the preliminary pitch detector 125 functions to produce an approximately correct indication of 100 cycles per second as the fundamental frequency of the applied signal wave, the upper pair of networks 120, 121 function to select the adjacently located fourth and fifth harmonic component of this fundamental, whereas the lower pair of networks 122, 123 select only one wave component, namely the second harmonic since there is no $(5/2)^{th}$ harmonic of the fundamental present. Under such circumstances there is present in the output circuit of low-pass filter 128 a difference frequency component of 100 cycles. The 200 cycle second harmonic component is substantially suppressed in modulator 127, and is greatly attenuated in the output circuit of low-pass filter 130. The upper and lower frequency comparison branches comprising limiters 136 and 142, respectively, operate to limit the output wave, or waves, to a predetermined magnitude before their direct voltage components are removed in transformers 137, 137'. The conventional frequency discriminator, or slope circuits, 138, 138' may have identical characteristics, and operate to attenuate the respective wave components transmitted therethrough in accordance with the frequency of the component. In this assumed example, the energy level at the output of the upper frequency discriminator 138 will exceed that of the output of the lower frequency discriminator because of the lower frequency of the wave componets traversing it. The relative potential at the upper end of load resistor 140 will exceed the potential at the lower end of load resistor 145, and consequently, the potential at the upper end of balanced resistor 147, 147 will be positive with respect to ground. Under such circumstances, discharge device 135 will be conducting, and the voltage drop across its anode resistor 158 will be sufficient to reduce the control electrode potential of switching amplifier 132 to a sufficient degree to render this amplifier nonconductive. Similarly, since discharge device 133 is nonconductive, the control electrode of its associated switching amplifier 131 is at a sufficient level to permit conduction through this amplifier. Under these foregoing conditions, the 100-cycle difference frequency at the output of low-pass filter 128 is transmitted through switching amplifier 131 to the frequency measuring circuit 32 where it is effective in the previously described manner to bring about a suitable identifying low frequency oscillation from oscillator 36. If, however, it be assumed that the preliminary pitch detector 125 erroneously produces an indication representative of a fundamental frequency that is twice the frequency of the actual fundamental, or 200 cycles per second in the assumed example, the upper selecting networks 120, 121 will tend to select frequencies which correspond to the eighth and tenth harmonics of the actual fundamental frequency. Simultaneously, the lower selecting networks 122, 123 tend to select frequencies corresponding to adjacent harmonics of one-half the indicated fundamental frequency, and will select frequencies corresponding to the second and third harmonics of the true fundamental component. Under these circumstances the selected components when combined in the balanced modulators 126, 127 and filtered in the low-pass filters 128, 130 produce difference frequency components of 100 cycles per second at the output of filter 130 and 200 cycles per second at the output of filter 128. Frequency discriminator 138 will attenuate the level of the wave component in the upper branch to a greater degree than will its conjugate member 138' attenuate the lower branch wave. The frequency discriminated output wave in the lower branch will now exeed the level of that in the upper branch, and the lower end of load resistor 145 will become relatively more positive than will the upper end of load resistor 140. Under such conditions, the balanced differential resistor 147, 147 assumes at its upper end a potential that is negative with respect to ground, and which cuts off current conduction in the associated electron discharge device 135. This action increases the control electrode bias of the associated switching amplifier 132 to a sufficient degree to induce conduction therein, and at the same time establishes current conduction in the associated electron discharge device 133. This latter action, by virtue of the associated potential drop across the anode resistor 157, decreases the control electrode bias of switching amplifier 131 to a point where this amplifier becomes nonconductive, and the 100-cycle component from the lower branch filter 130 is now supplied to the frequency measuring circuit 32. From the foregoing described series of operations, it will be appreciated that notwithstanding the erroneous frequency indication that was produced by the preliminary pitch detector 125, the actual frequency indication supplied to frequency measuring circuit 32 was the correct one.

Because the previously known heterodyne method of indicating the frequency of the fundamental wave component rarely, if ever, produces an indication that is equivalent to the third power of the true fundamental frequency, the embodiment described in Fig. 4 was limited to two pairs of selective networks which were constructed and arranged as indicated. It is, of course, obvious that more than two pairs of selective networks may be so arranged as to select frequencies which correspond to more than two pairs of adjacently located wave components if such an arrangement is desirable. It is also apparent that although the selective networks which have been described in connection with the foregoing arrangement employed variable inductance elements, the invention may be practiced with equal facility by using variable capacitance elements in a similar suitable arrangement. Because this invention is suitable for use under a great variety of circumstances it is to be expected that various embodiments which do not depart from the spirit and scope of the invention as it has been here disclosed will occur to those skilled in the related art.

What is claimed is:

1. A system for producing an indication of the instantaneous frequency of the fundamental component of a recurring complex wave which includes a number of wave components in integral harmonic frequency relation, which system comprises means for deriving from said wave an electromotive force the amplitude of which is approximately indicative of the frequency separation between adjacently related harmonic wave components, variable frequency-sensitive means for selecting adjacently related harmonic wave components from said wave, control means responsive to said derived electromotive force for adjusting the selective action of said variable frequency-sensitive means with respect to the frequencies of such adjacently related harmonic wave components as the amplitude of such electromotive force varies, and means for combining said selected adjacently related harmonic wave components to derive from said combination an indication of the frequency difference between said components, said frequency difference being representative of the instantaneous frequency of the fundamental component of said applied complex wave.

2. The system defined in claim 1 wherein the electromotive force deriving means include means for the generation of a variable unidirectional voltage the magnitude of which varies in accordance with frequency variations of the adjacently related harmonic wave components, and said control means includes means for the generation of a unidirectional current the magnitude of which varies in direct relation with variations in the magnitude of said unidirectional voltage.

3. The system defined in claim 1 wherein the said variable frequency-sensitive means comprise at least two frequency sensitive electrical networks and in which the said control means includes means for generating a unidirectional current the magnitude of which is varied in direct relation to the magnitude of the said derived electromotive force, the frequency sensitive characteristics of said networks being responsive to changes in the magnitude of said unidirectional current.

4. The system defined in claim 1 in which the means for combining the selected adjacently related harmonic wave components to derive from said components an indication of the frequency difference between said components includes modulatory means for the combining of said components to produce sum and difference frequency modulation products and also means for selecting the difference frequency product of said combination.

5. The system defined in claim 1 wherein the variable frequency-sensitive means comprise means for segregating from said wave four harmonically related wave components, and in which said means for combining said components include means for combining said components in two groups of two components in each group, and means for selectively choosing the lower of the two difference frequency products of said combinations.

6. The system defined in claim 1 wherein the variable frequency-sensitive means comprise four frequency sensitive electric networks, and in which the frequency response characteristics of said networks are varied in accordance with variations in the magnitude of said derived electromotive force the amplitude of which is approximately indicative of the frequency separation between the adjacently related harmonic wave components.

7. The system defined in claim 1 wherein the means for deriving said electromotive force comprises means for segregating the voltage peak of maximum amplitude in each of successive cycles of said recurring complex wave and means responsive to said segregated peaks for producing an electromotive force the magnitude of which is proportional to the time interval between successive ones of said peaks.

8. The system defined in claim 1 wherein the variable frequency-sensitive means comprise a plurality of electrical networks, each network comprising a capacitive element and an inductive element, the reactive value of one element being responsive to changes in the magnitude of said derived electromotive force.

9. The system defined in claim 7 which includes means for enlarging the natural asymmetry of the complex wave; and means for selectively choosing the asymmetrical wave portion that includes the voltage peak of maximum amplitude.

10. A system for producing an indication of the instantaneous frequency of the fundamental component of a recurring complex signal wave which includes a plurality of wave components in integral harmonic frequency relation, comprising means for dividing said wave into a plurality of wave portions, means for deriving from a first wave portion an electromotive force the magnitude of which is approximately proportional to the frequency interval between adjacent wave components, a plurality of electrical networks each of which is selective of a single wave component from a second portion of said wave, said single wave components being in adjacently related harmonic relation, means responsive to said electromotive force for adjusting the selective properties of each of said networks with respect to the frequencies of such adjacently related harmonic wave components in accordance with changes in the magnitude of said electromotive force, modulatory means for combining said selected wave components, and means for deriving from said combination an indication of the frequency difference between said components, said difference being representative of the instantaneous frequency of the fundamental component of said complex wave.

11. The system described in claim 10 wherein each one of said plurality of electrical networks comprises inductive and capacitive elements and in which the inductive reactance of each of said inductive elements is controlled in accordance with the magnitude of said derived electromotive force.

12. The system described in claim 11 which includes means responsive to a third portion of the complex wave for discarding said derived indication when the wave components of the complex wave are not in integral harmonic frequency relation.

13. In a system for producing an indication of the instantaneous frequency of the fundamental component of a variable frequency complex wave which includes a number of wave components in integral harmonic frequency relation, means for segregating from said complex wave a pair of adjacent harmonic frequency wave components, said means comprising an electrical network including a pair of input terminals, a pair of parallel transmission channels connected to said terminals and a pair of output terminals connected to each of said channels, each of said transmission channels including at least one reactive element the reactance of which is variable in magnitude in response to variations in the frequency separation between adjacent harmonic components of the wave, and means for combining the segregated wave components to derive from said combination an indication of the frequency difference between said components, such frequency difference being representative of the instantaneous frequency of the fundamental component of the complex wave.

14. In a combination for producing an indication of the instantaneous frequency of the fundamental component of a variable frequency complex wave which wave includes a number of integrally related harmonic frequency wave components, means for deriving from said wave an electromotive force the magnitude of which is approximately indicative of the frequency separation between adjacent harmonic wave components, a pair of selective electrical networks each of said networks comprising parallel capacitive and inductive reactive elements, each of said inductive elements having a control element interconnected therewith and with said electromotive force deriving means for regulating the effective value of said inductive element in accordance with the magnitude of said derived electromotive force, said networks being selective of a pair of adjacently related harmonic wave components of said complex wave, and means for combining the selected wave components to derive from such combination an indication of the frequency difference between said components, such frequency difference being representative of the instantaneous frequency of the fundamental component of the complex wave.

15. In a combination for producing an indication of the instantaneous frequency of the fundamental component of a variable frequency complex wave which wave includes a number of integrally related harmonic frequency wave components, means for deriving from said wave an electromotive force the magnitude of which is approximately indicative of the frequency separation between adjacent harmonic wave components, a pair of selective electrical networks, one of said networks being selective of the $(n)$th harmonic wave component, the other of said networks being selective of the $(n\pm1)$th harmonic wave component, each of said networks comprising a capacitive element and a first inductive element, a second inductive element interconnected with said first inductive element, and interconnecting means for regulating the current flowing in said second inductive element in accordance with the magnitude of said derived electromotive force whereby the effective value of the first inductive element in each selective network is varied in proportion to the magnitude of the current flowing in said second inductive element and said networks respectively remain selective of said $(n)$th and $(n\pm1)$th harmonic wave components as said complex wave changes in frequency, and means for combining the selected harmonic wave components to derive from said combination an indication of the frequency difference between such components, such frequency difference being representative of the instantaneous frequency of the fundamental component of the complex wave.

EUGENE PETERSON.

REFERENCES CITED

The following references are of record in the file of this patent:

UNITED STATES PATENTS

| Number | Name | Date |
| --- | --- | --- |
| 1,636,436 | Rettenmeyer | July 19, 1927 |
| 2,151,091 | Dudley | Mar. 21, 1939 |
| 2,243,527 | Dudley | May 27, 1941 |
| 2,443,603 | Crost | June 22, 1948 |